US010666844B2

(12) United States Patent
Qi et al.

(10) Patent No.: US 10,666,844 B2
(45) Date of Patent: May 26, 2020

(54) 3D PANORAMIC CAMERA WITH BUILT-IN STABILIZER

(71) Applicant: Hangzhou Zaixian Technology Co. Ltd, Hangzhou, Zhejiang (CN)

(72) Inventors: Yongjin Qi, Zhejiang (CN); Jialin Wang, Zhejiang (CN); Shubo Qi, Zhejiang (CN)

(73) Assignee: HANGZHOU ZAIXIAN TECHNOLOGY CO. LTD, Hangzhou, Zhejiang (CN)

( * ) Notice: Subject to any disclaimer, the term of this patent is extended or adjusted under 35 U.S.C. 154(b) by 0 days.

(21) Appl. No.: 16/242,623

(22) Filed: Jan. 8, 2019

(65) Prior Publication Data

US 2020/0053260 A1 Feb. 13, 2020

(30) Foreign Application Priority Data

Aug. 10, 2018 (CN) .......................... 2018 1 0911919

(51) Int. Cl.
*H04N 5/225* (2006.01)
*G02B 27/64* (2006.01)
(Continued)

(52) U.S. Cl.
CPC ......... *H04N 5/2253* (2013.01); *G02B 27/646* (2013.01); *G03B 17/561* (2013.01);
(Continued)

(58) Field of Classification Search
CPC ............. H04N 5/2253; H04N 5/23238; H04N 5/2254; G02B 27/646; G03B 17/561; G03B 37/04
See application file for complete search history.

(56) References Cited

U.S. PATENT DOCUMENTS 9,438,800 B1 * 9/2016 Kozko ..................... G06T 11/00
9,674,435 B1 * 6/2017 Monari ................ H04N 13/243
(Continued)

*Primary Examiner* — Timothy J Henn

(74) *Attorney, Agent, or Firm* — Muncy, Geissler, Olds & Lowe, P.C.

(57) ABSTRACT

The present invention discloses a 3D panoramic camera with a built-in stabilizer, and relates to a panoramic camera. At present, a VR panoramic camera has the disadvantages of great difficulty in later-stage quilting, huge volume and unstable image. The present invention comprises an optical information acquisition sensing module and a stabilizer module, wherein the optical information acquisition sensing module comprises a lens mounting base and a plurality of lenses, the lens mounting base is cylindrical, the lenses are circumferentially and uniformly provided on an outer side of the lens mounting base, an inner chamber of the lens mounting base is a motor holding chamber, and the stabilizer module comprises a first motor, a second motor, a third motor and a stabilizer frame body, the second motor and the third motor are provided in the motor holding chamber within the lens mounting base, the first motor is located below the lens mounting base, and the first motor, the second motor and the third motor are connected with the lens mounting base through the stabilizer frame body to realize motion transmission. In this technical solution, the stabilizer is built-in, the volume is small, the workload of post-production is decreased and the difficulty in post-production is reduced.

19 Claims, 5 Drawing Sheets

(51) Int. Cl.
*H04N 5/232* (2006.01)
*G03B 17/56* (2006.01)
*G03B 37/04* (2006.01)

(52) U.S. Cl.
CPC ............ *G03B 37/04* (2013.01); *H04N 5/2254* (2013.01); *H04N 5/23238* (2013.01)

(56) References Cited

U.S. PATENT DOCUMENTS

| | | | |
|---|---|---|---|
| 9,843,724 B1* | 12/2017 | Brailovskiy | H04N 5/23238 |
| 10,104,289 B2* | 10/2018 | Enriquez | H04N 5/23238 |
| 10,165,186 B1* | 12/2018 | Brailovskiy | H04N 5/23267 |
| 10,390,007 B1* | 8/2019 | Chen | H04N 13/161 |
| 2004/0183941 A1* | 9/2004 | McCutchen | H04N 5/2251 |
| | | | 348/373 |
| 2009/0058988 A1* | 3/2009 | Strzempko | G06T 3/4038 |
| | | | 348/36 |
| 2012/0229596 A1* | 9/2012 | Rose | G06T 3/4038 |
| | | | 348/36 |
| 2015/0138311 A1* | 5/2015 | Towndrow | H04N 5/23238 |
| | | | 348/36 |
| 2016/0352982 A1* | 12/2016 | Weaver | H04N 5/2258 |
| 2018/0210322 A1* | 7/2018 | Malukhin | G03B 17/561 |
| 2018/0239226 A1* | 8/2018 | Lee | G06T 5/006 |
| 2019/0031369 A1* | 1/2019 | Zhang | G03B 37/04 |
| 2019/0082114 A1* | 3/2019 | Jeon | H04N 5/232411 |

* cited by examiner

3D PANORAMIC CAMERA WITH BUILT-IN STABILIZER

FIELD OF THE INVENTION

The present invention relates to a panoramic camera, in particular to a 3D panoramic camera with a built-in stabilizer.

BACKGROUND OF THE INVENTION

With the progress and development of science, the production level of virtual reality movies (VR movies for short) and panoramic short videos (VR videos for short) becomes increasingly higher, and a brand new sensory experience, such as vision, hearing and tactility is created, such that people can immerse themselves in the virtual environment by means of experience devices and feel the presence of the interaction between the external environment and the characters without leaving home.

At present, the problems of VR panoramic cameras are as follows:

(1) The number of camera lenses used is small, and the safety distance is long during later-stage quilting. There will be a situation that a panoramic camera does not capture an object to be photographed. If many lenses are used, the volume of the device is large, the deadweight is great and it is not easy to carry.

Safety distance is a special term for VR film and television, which means the shortest distance between a person or object to be photographed and a panoramic camera at the time of photographing of the panoramic camera, due to the visual difference between lenses, in consideration of the limitation of the later-stage quilting. When the distance is smaller than the safety distance, the photographed images cannot be quilted as qualified 3D VR videos.

(2) When an external stabilizer is equipped, the volume of the panoramic camera plus the stabilizer is huge, such that a situation that the panoramic camera photographs the external stabilizer into the images and more manpower and time costs are needed to erase unnecessary parts in post-production will be caused in a 360-degree environment.

(3) If no stabilizer is equipped, a situation that stable image source materials cannot be obtained in mobile photographing will be caused. However, human beings have behavioral perception, and will feel a strong sense of vertigo when watching movies made from such materials through head displays, which reduces the quality of experience.

SUMMARY OF THE INVENTION

The technical problems to be solved and the technical tasks proposed by the present invention are to perfect and improve the existing technical solution, and provide a 3D panoramic camera with a built-in stabilizer, so as to realize the purpose of taking into account the quality of experience, post-production cost and portability. To this end, the present invention adopts the following technical solution.

A 3D panoramic camera with a built-in stabilizer comprises an optical information acquisition sensing module used for acquiring optical information and a stabilizer module used for adjusting a viewing direction, wherein the optical information acquisition sensing module comprises a lens mounting base and a plurality of lenses provided on the lens mounting base, the lens mounting base is cylindrical, the lenses are circumferentially and uniformly provided on an outer side of the lens mounting base, an inner chamber of the lens mounting base is a motor holding chamber, and the stabilizer module comprises a first motor, a second motor, a third motor and a stabilizer frame body, the second motor and the third motor are provided in the motor holding chamber within the lens mounting base, the first motor is located below the lens mounting base, and the first motor, the second motor and the third motor are connected with the lens mounting base through the stabilizer frame body to realize motion transmission. The use of the first motor, the second motor and the third motor can realize the change of heading direction, rolling and pitch angle. Because the second motor and the third motor are located in the lens mounting base, and the first motor is located right below the motor holding chamber and the stabilizer is built-in, it helps to reduce the volume. At the same time, there will be no image of the external stabilizer in the video stream resulting from video production, the workload of post-production is decreased and the difficulty in post-production is reduced; and the stabilizer is mounted by adopting the frame body, the frame structure of the frame body facilitates a reduction in weight, an increase in fluidity of air and an improvement of cooling effect.

As a preferred technical means, the stabilizer frame body comprises a bottom seat, a top seat located above the bottom seat, a vertically provided first supporting rod located between the bottom seat and the top seat, the second motor and the third motor are provided above the top seat, the first motor is provided below the bottom seat and connected with the bottom seat to drive the bottom seat to rotate, the supporting rod is fixedly connected with the bottom seat and the top seat through a connecting member, a holding chamber is formed between the bottom seat and the top seat, image processing and storage modules connected with the optical information acquisition sensing module are provided in the holding chamber, the first motor drives the entire 3D panoramic camera to rotate through the bottom seat, the second motor and the third motor drive the lens mounting base to rotate correspondingly, the first motor, the second motor and the third motor are provided perpendicular to each other, and the three motors work in concert to realize 3D photographing of the camera. By separating an image sensor from an integrated circuit of the camera, the distance between the lenses is shorter, the optimal distance of optical stream quilting of 3D VR videos can be reached, the visual difference during photographing is reduced, the safety distance of the 3D panoramic camera is shortened to 10 cm, and under the situation that the distance between the person or object to be photographed and the camera is very short, the photographed images can still be quilted into a complete high-quality 3D VR video. The quality of VR video streams is effectively improved. A guarantee of technical parameters is provided for the photographing robot at the "first person" view angle. The narrative method of VR images is enriched.

As a preferred technical means, a power supply module used for supplying power is provided on the bottom seat and a cooling fan is provided above the power supply module; a top surface of the base connecting portion is provided with an inertial sensor, and the top of the lens mounting base is provided with a hollowed-out protective cover in a covering manner; and a top surface of the base is provided with an annular groove, and a counterweight stabilizing block is embedded in the annular groove. The power supply module can supply power for the image processing and storage modules, the first motor, the second motor, the third motor, etc., the flexibility of use is improved and the expansion of the scope of use is facilitated. The cooling fan improves the working reliability, the external air can pass through the stabilizer frame body to promote the air circulation and speed up the cooling of the image processing and storage modules. The working performance is ensured. The protective cover can reduce the impurities that enter the motor holding chamber and improve the working reliability of the motor. Because of the existence of the protective cover, it can prevent fingers or the like from stretching inside, improve the working safety, avoid the harm to the operator when the motor works, including scalding or the like, and protect the motor holding chamber at the same time. The stabilizing block is fixed in the annular groove by fasteners. Because the stabilizing block can be placed anywhere in the annular groove, it is convenient to arrange the stabilizing block. Moreover, by adopting the embedded placement, continuous touching caused due to convexity, which may lead to a change in the position of the stabilizing block and affect the stability, can be avoided.

As a preferred technical means, the image processing and storage modules are circumferentially and uniformly provided, and the image processing and storage modules are connected with the lenses through image signal transmission lines; the image processing and storage modules are hung on a periphery of the holding chamber through fixed pressing plates, and the power supply module and the cooling fan are provided at the central portion of the holding chamber. The image processing and storage modules of the action camera can be used to obtain stable image raw materials in photographing of strong movements, so as to facilitate post-production of high-quality mobile 3D VR films; and the image processing and storage modules are provided on the periphery of the holding chamber in a hanging manner and can be cooled in the entire circumferential direction, the cooling surface is large and rapid cooling can be realized. The number of the image processing and storage modules matches the number of the lenses. When the number of the image processing and storage modules is large, they may be hung at upper and lower layers.

As a preferred technical means, the stabilizer frame body further comprises a plurality of vertically provided second supporting rods connected with the top seat, a first connecting member provided between the second supporting rods and the second motor, a second connecting member provided between the second motor and the third motor, and a third connecting member provided between the third motor and the lens mounting base. The second supporting rods are connected with the first connecting member and the first connecting member is connected with the second motor, such that the second motor is fixedly connected onto the top seat and the motion of the first motor is transmitted to the second motor. The second motor is connected with the third motor through the second connecting member, such that the motion of the first motor and the second motor is transmitted to the third motor. The third motor is connected with the lens mounting base through the third connecting member, that is, the motion of the first motor, the second motor and the third motor is transmitted to the lens mounting base. By adopting the supporting rods, accurate leveling is realized, such that the motion can be transmitted accurately, the error can be reduced and the working stability can be improved.

As a preferred technical means, the first connecting member is mirrored L-shaped and comprises a second supporting rod connecting portion in parallel with the top seat, and a vertical second motor fixed connecting portion connected with a fixed portion of the second motor; the second connecting member comprises a second motor rotatable connecting portion connected with a rotatable portion of the second motor, and a third motor fixed connecting portion connected with a fixed portion of the third motor; and the second motor rotatable connecting portion of the second connecting member is perpendicular to the third motor fixed connecting portion such that the second motor and the third motor are provided perpendicular to each other. The connecting structure is compact and reliable, facilitating a reduction in the connection distance and in the volume of the entire device.

As a preferred technical means, the second motor rotatable connecting portion of the second connecting member is connected with the rotatable portion of the second motor by means of clamping, and the third motor fixed connecting portion of the second connecting member is detachably connected with the fixed portion of the third motor by means of a screw. The second motor rotatable connecting portion is provided with an opening to make it have certain elasticity. A fastener such as a bolt used for connecting the opening is provided at the opening. After the second motor rotatable connecting portion is sleeved on the rotatable portion of the second motor, the position is adjusted, and the second motor rotatable connecting portion is clamped tight by means of a fastener. At this time, the second motor rotatable connecting portion is fixed on the rotatable portion of the second motor by means of clamping. This means has the advantages that the position is convenient to be adjusted, the working is reliable, the stability of the device is guaranteed, the motion accuracy is improved, the workload at the later stage is reduced and the visual effect is improved.

As a preferred technical means, the third connecting member comprises a base connecting portion connected with the lens mounting base, a third motor rotatable connecting portion connected with the rotatable portion of the third motor and a plurality of vertically provided third supporting rods located between the rotatable connecting portion and the third motor rotatable connecting portion, the third motor rotatable connecting portion is annular, a supporting plate is provided on an outer side of the third motor rotatable connecting portion, the base connecting portion is in parallel with the supporting plate, and the third supporting rods are provided between the base connecting portion and the supporting plate; and two ends of the base connecting portion are connected with the lens mounting base such that the base connecting portion is connected across the lens mounting base. The two ends of the base connecting portion are connected with the lens mounting base, and the crossover connection mode realizes good connection reliability and improves the connecting strength.

As a preferred technical means, a shell is provided below the bottom seat, the rotatable portion of the first motor is connected with the bottom seat through a plurality of vertical connecting rods, and the connecting rods are circumferentially and uniformly provided; and an electrical chamber is formed among the shell, the first motor and the bottom seat, a switching circuit, a charging circuit and a debugging module are provided in the electrical chamber, and the debugging module is provided with a USB interface and/or wireless communication module. Since the first motor uses a plurality of connecting rods to drive the bottom seat to rotate, compared with the force transmission implemented through the middle rotating shaft only, the rotating stability is better and the shaking is avoided. Both the bottom seat and the top seat may be stamping parts, and are provided with notches or the like on the premise that the support is guaranteed, which facilitates a reduction in weight and facilitates cooling.

As a preferred technical means, a cover body is provided between the bottom seat and the top seat, and the cover body is formed by front and rear cover body units spliced together; a panel for input and output and a communication interface are embedded in the cover body; and an electrical chamber is formed among the cover body, the bottom seat and the top seat, an integrated circuit board for image processing and storage connected with the lenses is hung in an upper chamber of the electrical chamber through a fourth supporting rod, a radiator is hung under the integrated circuit board through a fifth supporting rod, and the power supply module fixed on the bottom seat is provided below the radiator. The structure is simple and compact, and the volume is small.

Beneficial Effects

1. In this technical solution, by using the first motor, the second motor and the third motor, a change in heading direction, rolling and pitch angle is realized. Since the second motor and the third motor are located within the lens mounting base, the first motor is located right below the motor holding chamber and the stabilizer is built-in, it helps to reduce the volume. At the same time, there will be no image of the external stabilizer in the video stream resulting from video production, the workload of post-production is decreased and the difficulty in post-production is reduced.

2. In this technical solution, by separating the image sensor from the integrated circuit of the camera, the distance between the lenses is shorter, the optimal distance of optical stream quilting of 3D VR videos can be reached, the visual difference during photographing is reduced, the safety distance of the 3D panoramic camera is shortened to 10 cm, and under the situation that the distance between the person or object to be photographed and the camera is very short, the photographed images can still be quilted into a complete high-quality 3D VR video. The quality of VR video streams is effectively improved. A guarantee of technical parameters is provided for the photographing robot at the "first person" view angle. The narrative method of VR images is enriched.

3. By using the image processing and storage modules, stable image raw materials can be obtained in photographing of strong movements, and the post-production of high-quality mobile 3D VR films is facilitated.

4. The stabilizer is mounted by adopting the frame body, the frame structure of the frame body facilitates the decrease of weight, increase of fluidity of air and improvement of the cooling effect.

5. By adopting the supporting rods for connection, the supporting function is realized, and at the same time, accurate leveling is realized, such that the motion can be transmitted accurately, the error can be reduced and the working stability can be improved.

6. The second motor rotatable connecting portion is fixed on the rotatable portion of the second motor by means of clamping, this means has the advantages that the position is convenient to be adjusted, the working is reliable, the stability of the device is guaranteed, the motion accuracy is improved, the workload at the later stage is reduced and the visual effect is improved. The compactness of the structure can be improved and the reduction in volume is facilitated.

7. The two ends of the base connecting portion are connected with the lens mounting base, the crossover connection mode realizes good connection reliability and improves the connecting strength.

8. The protective cover can reduce the impurities that enter the motor holding chamber and improve the working reliability of the motor. It can prevent fingers or the like from stretching inside, improve the working safety, avoid the harm to the operator when the motor works, including scalding or the like, and protect the motor holding chamber at the same time.

9. The stabilizing block is fixed in the annular groove by fasteners. Because the stabilizing block can be placed anywhere in the annular groove, it is convenient to arrange the stabilizing block. Moreover, by adopting the embedded placement, continuous touching caused due to convexity, which may lead to a change in position of the stationary block and affect the stability, can be avoided.

10. Since the first motor uses a plurality of connecting rods to drive the bottom seat to rotate, compared with the force transmission implemented through the middle rotating shaft only, the rotating stability is better and the shaking is avoided.

Figure 1:
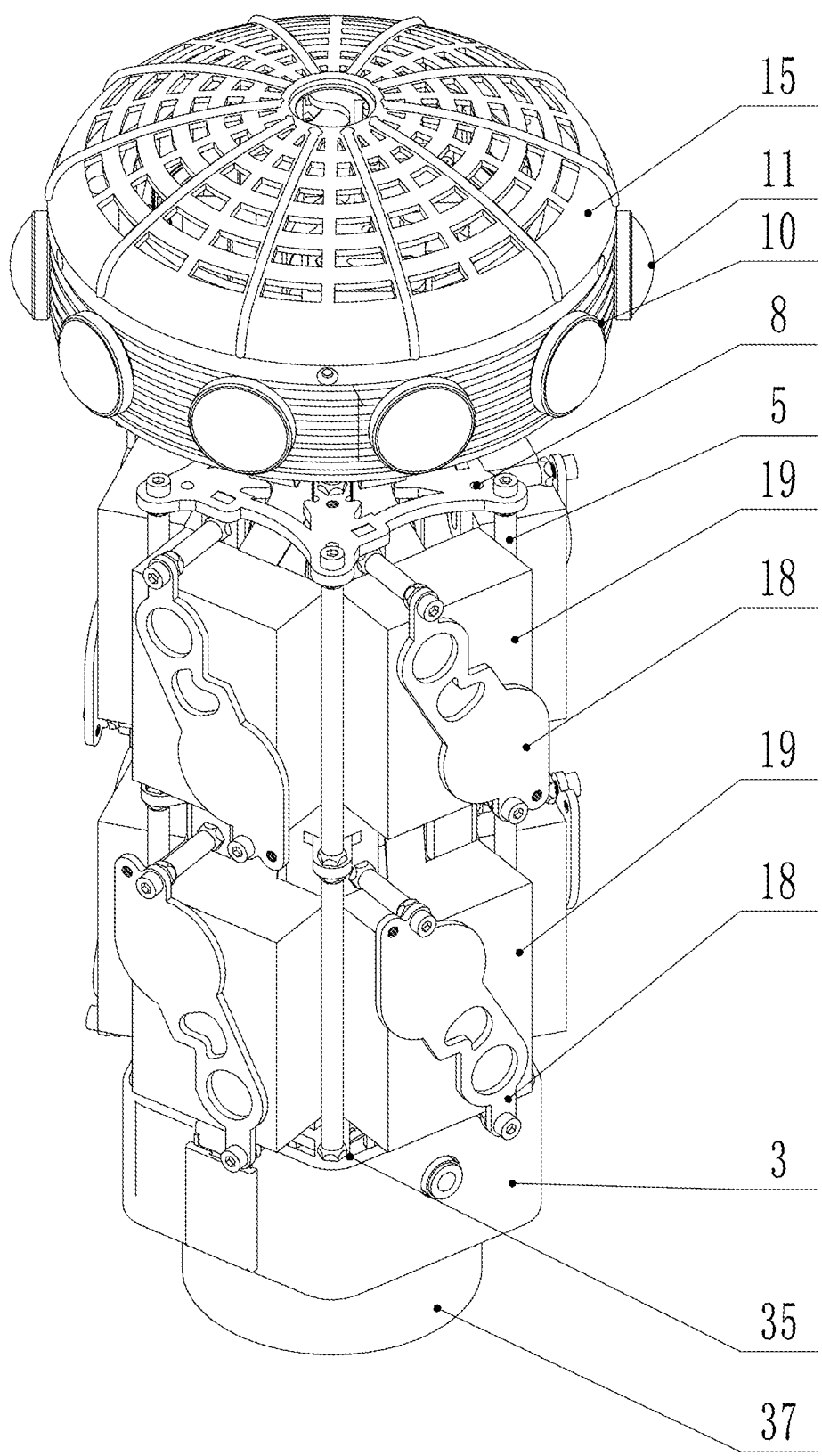
FIG. 1 illustrates a structural schematic view of embodiment 1 of the present invention.
Figure 2:
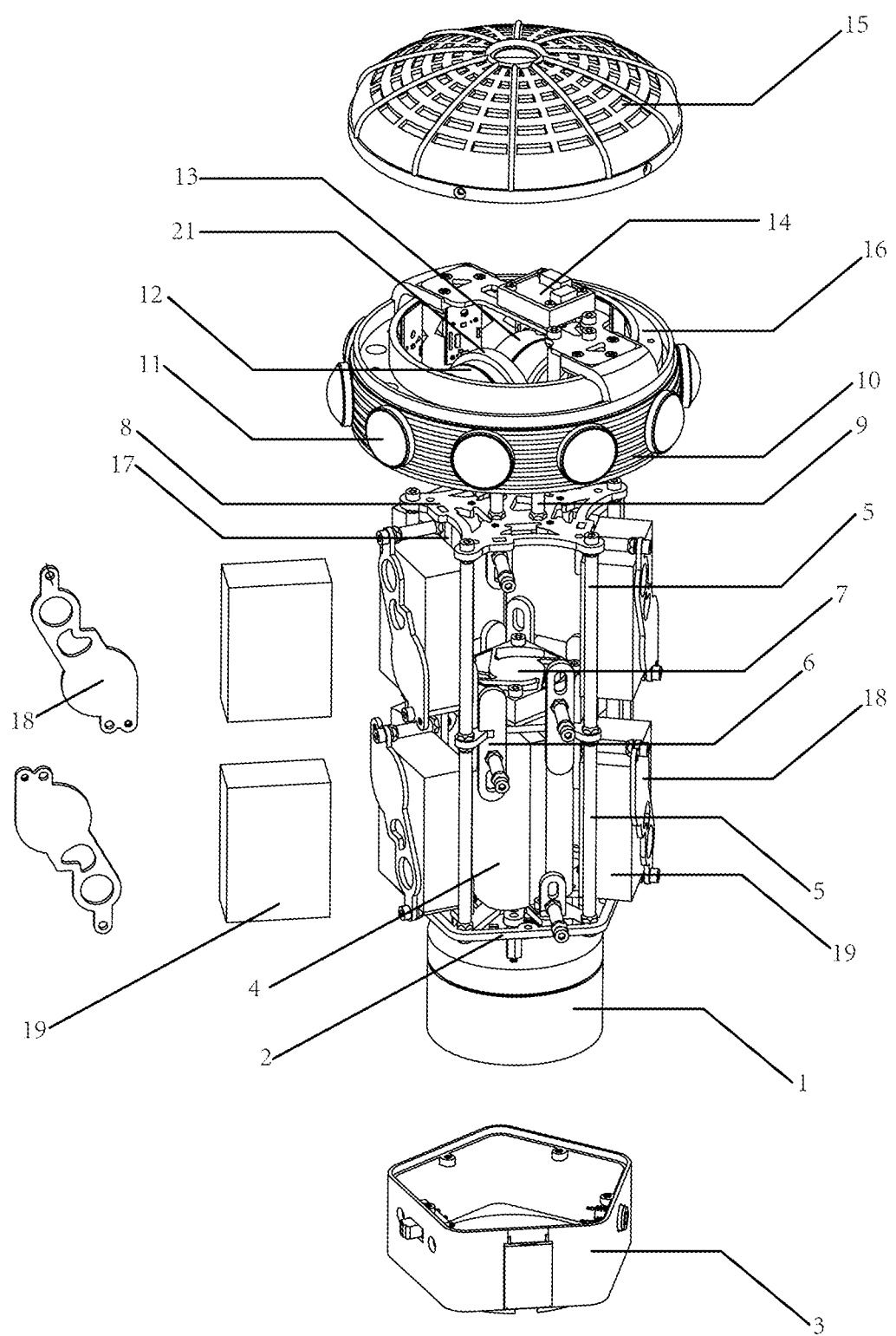
FIG. 2 illustrates a partial exploded structural schematic view of embodiment 1 of the present invention.
Figure 3:
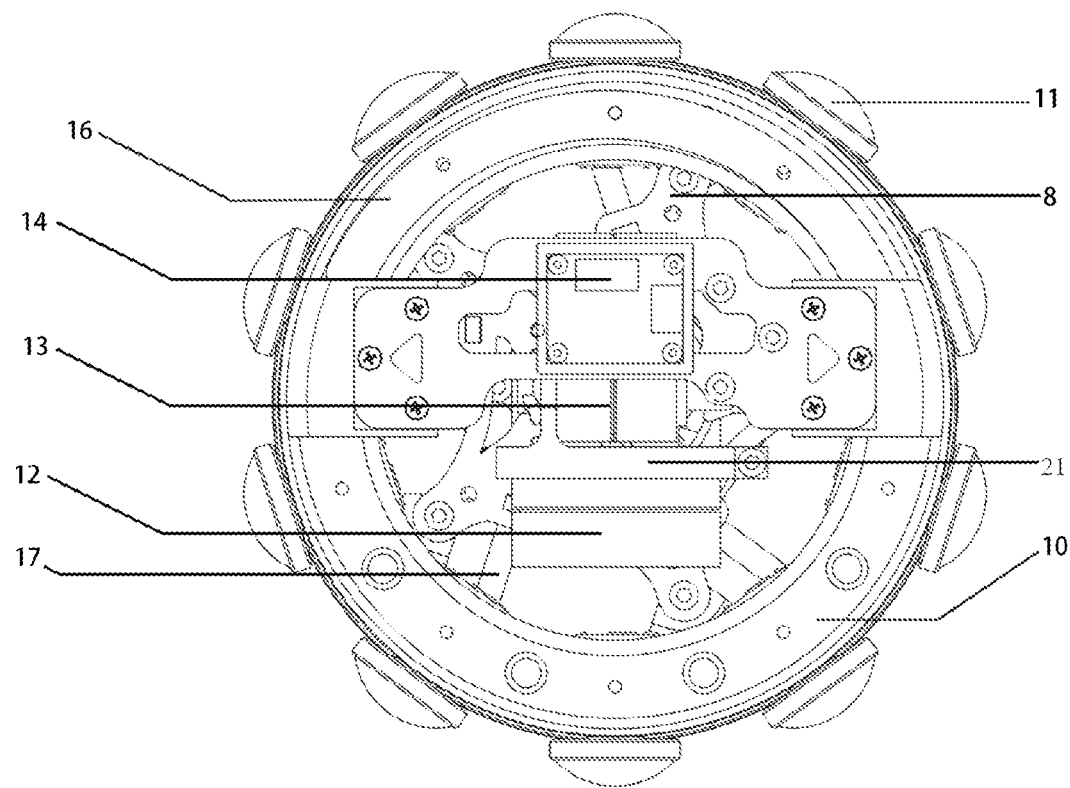
FIG. 3 illustrates a top structural schematic view of the present invention after a protective cover is removed.
Figure 4:
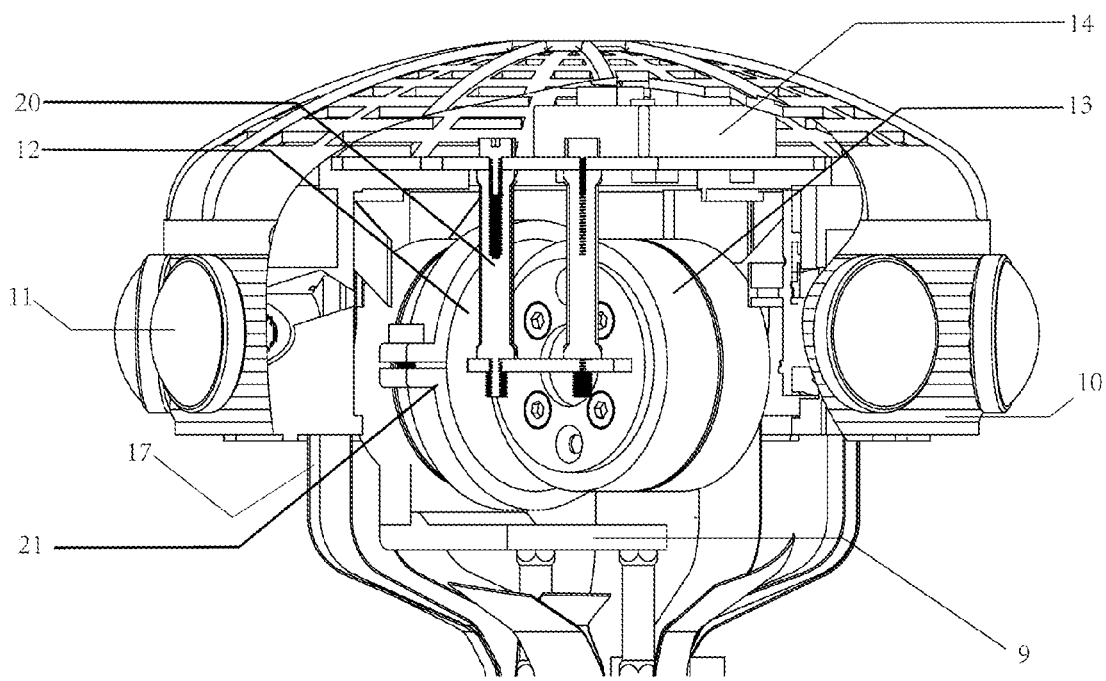
FIG. 4 illustrates a partial sectional structural schematic view of an upper portion of the present invention.
Figure 5:
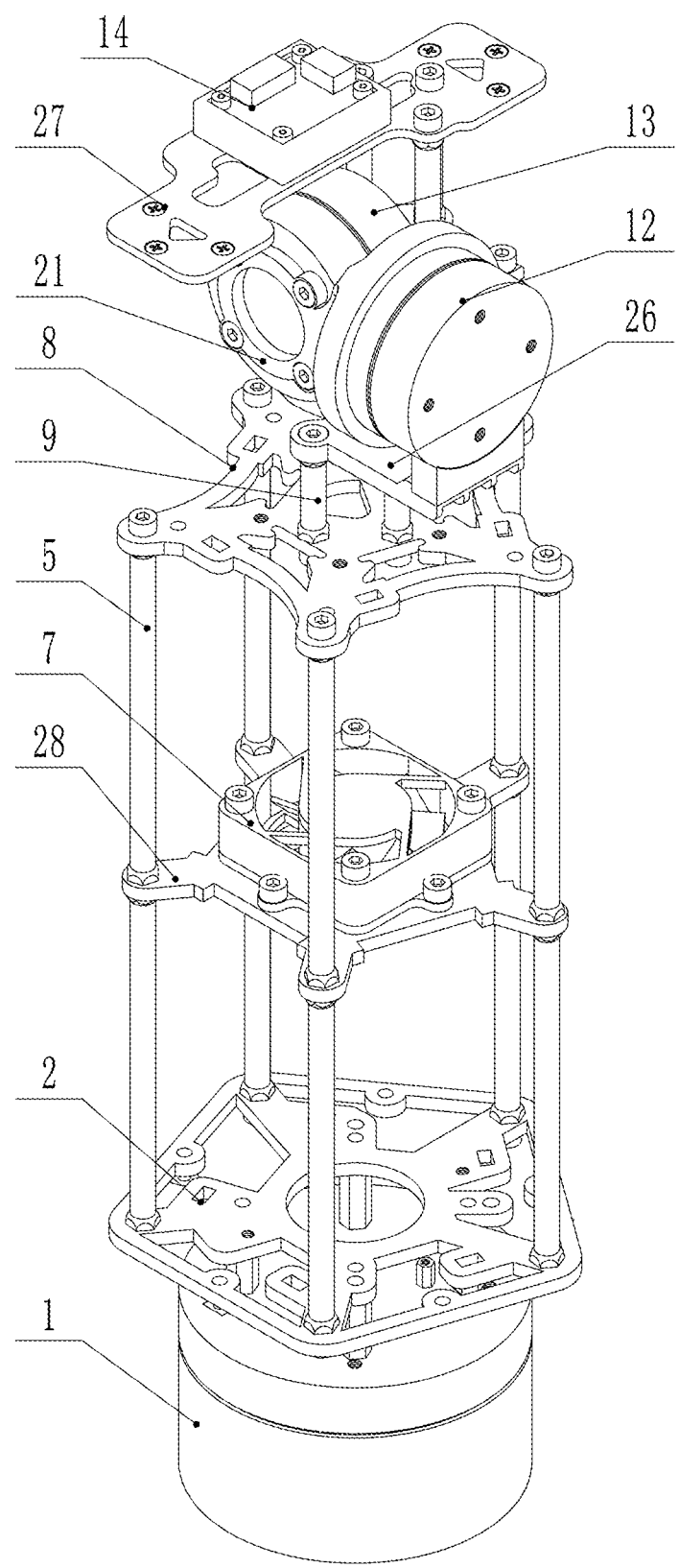
FIG. 5 illustrates a structural schematic view of a frame body of embodiment 1 of the present invention.

In the drawings, 1—first motor; 2—bottom seat; 3—shell; 4—power supply module; 5—first supporting rod; 6—connecting plate; 7—cooling fan; 8—top seat; 9—second supporting rod; 10—lens mounting base; 11—lens; 12—second motor; 13—third motor; 14—inertial sensor; 15—protective cover; 16—counterweight stabilizing block; 17—image signal transmission line; 18—fixed pressing plate; 19—image processing and storage module; 20—third supporting rod; 21—second connecting member; 22—integrated circuit board; 23—cover body; 24—fourth supporting rod; 25—fifth supporting rod; 26—first connecting member; 27—third connecting member; 28—middle seat.

DESCRIPTION OF THE EMBODIMENTS

The technical solution of the present invention will be further described below in detail with reference to the drawings.

Embodiment 1

As illustrated in FIGS. 1-5, the present invention comprises an optical information acquisition sensing module used for acquiring optical information and a stabilizer module used for adjusting a viewing direction, wherein the optical information acquisition sensing module comprises a lens mounting base 10 and a plurality of lenses 11 provided on the lens mounting base 10, the lens mounting base 10 is cylindrical, the lenses 11 are circumferentially and uniformly provided on an outer side of the lens mounting base 10, an inner chamber of the lens mounting base 10 is a motor holding chamber, and the stabilizer module comprises a first motor 1, a second motor 12, a third motor 13 and a stabilizer frame body, the second motor 12 and the third motor 13 are provided in the motor holding chamber within the lens mounting base 10, the first motor 1 is located below the lens mounting base 10, and the first motor 1, the second motor 12 and the third motor 13 are connected with the lens mounting base 10 through the stabilizer frame body to realize motion transmission. The use of the first motor 1, the second motor 12 and the third motor 13 can realize a change in heading direction, rolling and pitch angle. Because the second motor 12 and the third motor 13 are located within the lens mounting base 10, the first motor 1 is located right below the motor holding chamber, and the stabilizer is built-in, it helps to reduce the volume. At the same time, there will be no image of the external stabilizer in the video stream resulting from video production, the workload of post-production is decreased and the difficulty in post-production is reduced; and since the stabilizer is mounted by adopting the frame body, the frame structure of the frame body facilitates the decrease of weight, increase of fluidity of air and improvement of cooling effect.

In order to shorten the distance between the lenses 11, the stabilizer frame body comprises a bottom seat 2, a top seat 8 located above the bottom seat 2, and a vertically provided first supporting rod 5 located between the bottom seat 2 and the top seat 8, the second motor 12 and the third motor 13 are provided above the top seat 8, the first motor 1 is provided below the bottom seat 2 and connected with the bottom seat 2, the supporting rod is fixedly connected with the bottom seat 2 and the top seat 8 through a connecting member, a holding chamber is formed between the bottom seat 2 and the top seat 8, image processing and storage modules connected with the optical information acquisition sensing module are provided in the holding chamber, and the first motor 1, the second motor 12 and the third motor 13 are provided perpendicular to each other. By separating the image sensor from the integrated circuit of the camera, the distance between the lenses 11 is shorter, the optimal distance of optical stream quilting of 3D VR videos can be reached, the visual difference during photographing is reduced, the safety distance of the 3D panoramic camera is shortened to 10 cm, and under the situation that the distance between the person or object to be photographed and the camera is very short, the photographed images can still be quilted into a complete high-quality 3D VR video. The quality of VR video streams is effectively improved. A guarantee of technical parameters is provided for the photographing robot at the "first person" view angle. The narrative method of VR images is enriched. The view angle of the lenses 11 included in the information acquisition sensing module may be 180, 220, 250 degrees or the like.

In order to facilitate the post-production of high-quality mobile 3D VR films, the image processing and storage modules 19 may adopt image processing and storage modules of an action camera. The image processing and storage modules 19 are circumferentially and uniformly provided, and the image processing and storage modules 19 are connected with the lenses 11 through image signal transmission lines 17. The image processing and storage modules 19 of the action camera can be used to obtain stable image raw materials in photographing of strong movements, so as to facilitate post-production of high-quality mobile 3D VR films. In order to give consideration to the cooling effect and the compactness of the structure, the image processing and storage modules 19 are hung on a periphery of the holding chamber through fixed pressing plates 18, and the power supply module 4 and the cooling fan 7 are provided at a central portion of the holding chamber. The image processing and storage modules 19 are provided on the periphery of the holding chamber in a hanging manner and can be cooled in the entire circumferential direction, the cooling surface is large and rapid cooling can be realized. The number of the image processing and storage modules 19 matches the number of the lenses 11. When the number of the image processing and storage modules 19 is large, they may be hung at upper and lower layers. The number of the image processing and storage modules 19 used may be 10, 12, 14 or the like, and the number of the image processing and storage modules 19 matches the number of the lenses 11 and the image sensors. In this embodiment, ten lenses 11 and ten image processing and storage modules 19 are adopted, and the ten image processing and storage modules 19 are hung at upper and lower layers. When the image processing and storage modules 19 are hung at upper and lower layers, connecting plates 6 are provided on each of the top seat 8, the middle portion of the first supporting rod 5 and the bottom seat 2. Bolts are provided through the connecting members. After the image processing and storage modules 19 are attached against the connecting plates 6, the fixed pressing plates 18 are obliquely sleeved on the bolts which are then tightened by using nuts, such that the image processing and storage modules 19 are fixed.

In order to accelerate cooling and guarantee the working stability, a power supply module 4 used for supplying power is provided on the bottom seat 2, and a cooling fan 7 is provided above the power supply module 4; and the cooling fan 7 is provided on the first supporting rod 5 through a middle seat 28 in parallel with the bottom seat 2. The power supply module 4 can supply power for the image processing and storage modules, the first motor 1, the second motor 12, the third motor 13 and so on, which improves the flexibility of use and facilitates the expansion of the scope of use. The cooling fan 7 improves the working reliability. The external air can pass through the stabilizer frame body, promote air circulation, and accelerate the cooling of the image processing and storage modules 19 or the like. The working performance is guaranteed.

In order to facilitate mounting and adjustment and simultaneously guarantee the motion accuracy, the stabilizer frame body further comprises a plurality of vertically provided second supporting rods 9 connected with the top seat 8, a first connecting member 26 provided between the second supporting rods 9 and the second motor 12, a second connecting member 21 provided between the second motor 12 and the third motor 13, and a third connecting member 27 provided between the third motor 13 and the lens mounting base 10. The second supporting rods 9 are connected with the first connecting member 26, and the first connecting member 26 is connected with the second motor 12, such that the second motor 12 is fixedly connected onto the top seat 8 and the motion of the first motor 1 is transmitted to the second motor 12. The second motor 12 is connected with the third motor 13 through the second connecting member 21, such that the motion of the first motor 1 and the second motor 12 is transmitted to the third motor 13. The third motor 13 is connected with the lens mounting base 10 through the third connecting member 27, that is, the motion of the first motor 1, the second motor 12 and the third motor 13 is transmitted to the lens mounting base 10. By adopting the supporting rods, accurate leveling is realized, such that the motion can be transmitted accurately, the error can be reduced and the working stability can be improved.

In order to improve the compactness and reliability of the connecting structure, the first connecting member 26 is mirrored L-shaped and comprises a second supporting rod 9 connecting portion in parallel with the top seat 8, and a vertical second motor 12 fixed connecting portion connected with the fixed portion of the second motor 12; the second connecting member 21 comprises a second motor 12 rotatable connecting portion connected with the rotatable portion of the second motor 12, and a third motor 13 fixed connecting portion connected with the fixed portion of the third motor 13; and the second motor 12 rotatable connecting portion of the second connecting member 21 is perpendicular to the third motor 13 fixed connecting portion such that the second motor 12 and the third motor 13 are provided perpendicular to each other. The connecting structure is compact and reliable, the decrease of the connection distance is facilitated and the volume of the entire device is reduced.

The second motor 12 rotatable connecting portion of the second connecting member 21 is connected with the rotatable portion of the second motor 12 by means of clamping, and the third motor 13 fixed connecting portion of the second connecting member 21 is detachably connected with the fixed portion of the third motor 13 by means of a screw. The second motor 12 rotatable connecting portion is provided with an opening to make it have certain elasticity. A fastener such as a bolt used for connecting the opening is provided at the opening. After the second motor 12 rotatable connecting portion is sleeved on the rotatable portion of the second motor, the position is adjusted, and the second motor 12 rotatable connecting portion is clamped tight by using a fastener. At this time, the second motor 12 rotatable connecting portion is fixed on the rotatable portion of the second motor 12 by means of clamping. This means has the advantages that the position is convenient to be adjusted, the working is reliable, the stability of the device is guaranteed, the motion accuracy is improved, the workload at the later stage is reduced and the visual effect is improved.

The third connecting member 27 comprises a base connecting portion connected with the lens mounting base 10, a third motor 13 rotatable connecting portion connected with the rotatable portion of the third motor 13 and a plurality of vertically provided third supporting rods 20 located between the rotatable connecting portion and the third motor 13 rotatable connecting portion, the third motor 13 rotatable connecting portion is annular, a supporting plate is provided on an outer side of the third motor 13 rotatable connecting portion, the base connecting portion is in parallel with the supporting plate, and the third supporting rods 20 are provided between the base connecting portion and the supporting plate; and two ends of the base connecting portion are connected with the lens mounting base 10 such that the base connecting portion is connected across the lens mounting base 10. The two ends of the base connecting portion are connected with the lens mounting base 10, and the crossover connection mode realizes good connection reliability and improves the connecting strength.

In order to reasonably utilize the space and improve the safety, the top surface of the base connecting member is provided with an inertial sensor 14, and the top of the lens mounting base 10 is provided with a hollowed-out protective cover 15 in a covering manner. The base connecting portion acts as both a connecting member and a bearing member for the inertial sensor 14. The structure is comprehensively utilized to further improve the compactness. Moreover, the inertial sensor 14 is located on the top surface of the base connecting portion, the cooling effect is good and the working stability is better. At the same time, it is protected by the protective cover 15, the working reliability is ensured, the protective cover 15 can reduce impurities that enter the motor holding chamber and the working reliability of the motor is improved. Because of the existence of the protective cover 15, it can prevent fingers or the like from stretching inside, improve the working safety, avoid the harm to the operator when the motor works, including scalding or the like, and protect the motor holding chamber at the same time.

In order to improve the stability of the device and simultaneously facilitate the adjustment, the top surface of the base is provided with an annular groove, and a counterweight stabilizing block 16 is embedded in the annular groove. The stabilizing block is fixed in the annular groove by fasteners. Because the stabilizing block can be placed anywhere in the annular groove, it is convenient to arrange the stabilizing block. Moreover, by adopting the embedded placement, continuous touching caused due to convexity, which may lead to a change in position of the stationary block and affect the stability, can be avoided.

In order to facilitate control and simultaneously improve the transmission stability, a shell 3 is provided below the bottom seat 2, there is a spacing between the top surface of the first motor 1 and the bottom surface of the bottom seat 2, the rotatable portion of the first motor 1 is connected with the bottom seat 2 through a plurality of vertical connecting rods, and the connecting rods are circumferentially and uniformly provided; and an electrical chamber is formed among the shell 3, the first motor 1 and the bottom seat 2, a switching circuit, a charging circuit and a debugging module are provided in the electrical chamber, and the debugging module is provided with a USB interface and/or wireless communication module. Since the first motor 1 uses a plurality of connecting rods to drive the bottom seat 2 to rotate, compared with the force transmission implemented through the middle rotating shaft only, the rotating stability is better and the shaking is avoided. Both the bottom seat 2 and the top seat 8 may be stamping parts and are provided with notches or the like on the premise that the support is guaranteed, the reduction in weight is facilitated and the cooling is facilitated.

Embodiment 2

Figure 6:
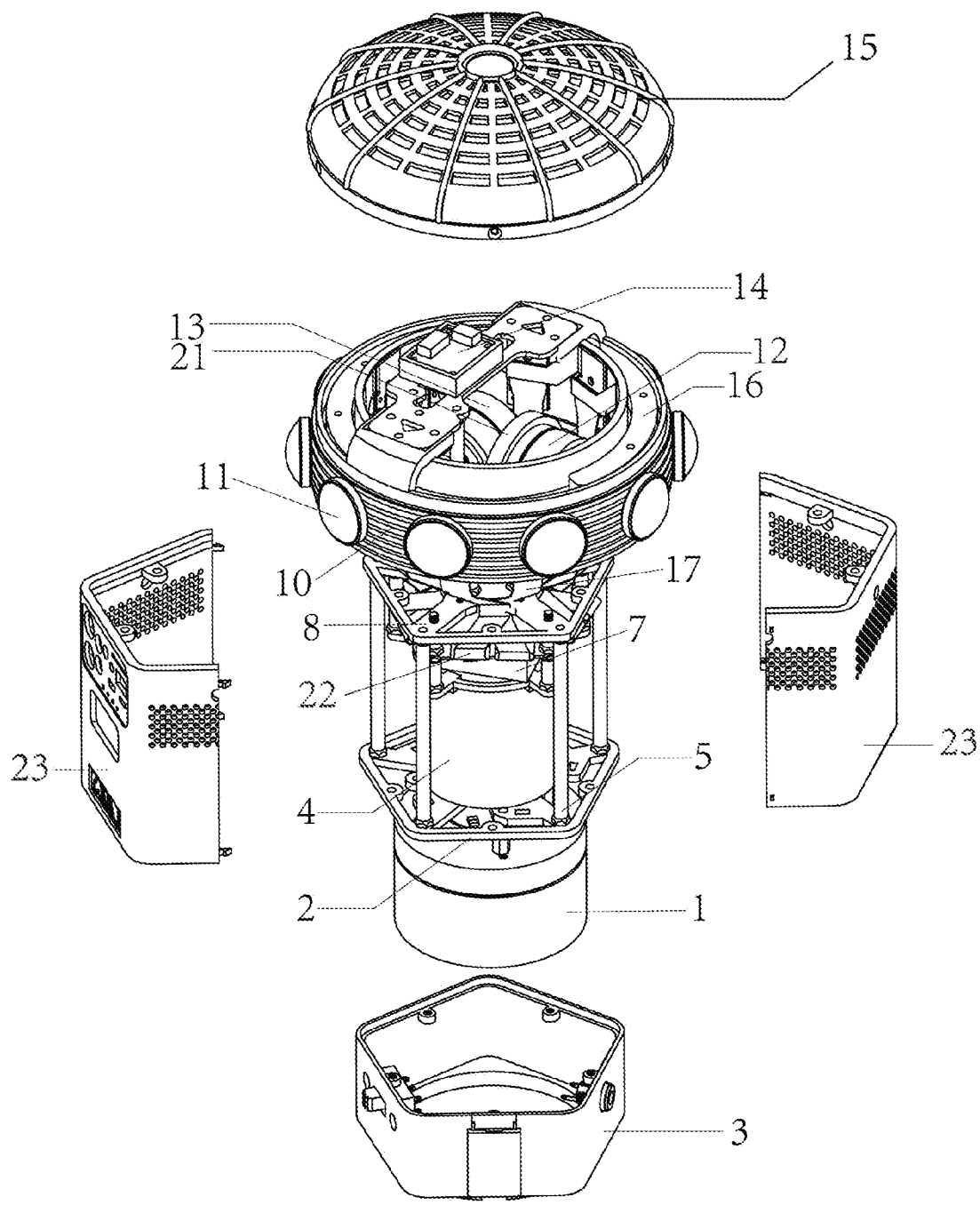
FIG. 6 illustrates an exploded structural schematic view of embodiment 2 of the present invention.

As illustrated in FIG. 6, the difference of embodiment 2 from embodiment 1 lies in that: in this technical solution, the power supply module 4, the cooling fan and the image processing and storage modules 19 are integrated into one module; a cover body 23 is provided between the bottom seat 2 and the top seat 8, and the cover body 23 is formed by front and rear cover body 23 units spliced together; a panel for input and output and a communication interface are embedded in the cover body 23; and an electrical chamber is formed among the cover body 23, the bottom seat 2 and the top seat 8, an integrated circuit board 22 for image processing and storage connected with the lenses 11 is hung in an upper chamber of the electrical chamber through a fourth supporting rod 24, a radiator is hung under the integrated circuit board 22 through a fifth supporting rod 25, and the power supply module 4 fixed on the bottom seat 2 is provided below the radiator. In this technical solution, the structure is more compact and is more convenient to carry.

The above 3D panoramic camera with a built-in stabilizer illustrated in FIGS. 1-6 is a specific embodiment of the present invention. It has embodied the prominent substantive features and remarkable progress of the present invention. Equivalent modifications may be made to shape, structure and other aspects according to the actual use needs under the inspiration of the present invention, and shall be all covered by the protective scope of this solution.

The invention claimed is:

1. A 3D panoramic camera with a built-in stabilizer, comprising an optical information acquisition sensing module used for acquiring optical information and a stabilizer module used for adjusting a viewing direction, wherein the optical information acquisition sensing module comprises a lens mounting base and a plurality of lenses provided on the lens mounting base, the lens mounting base is cylindrical, the lenses are circumferentially and uniformly provided on an outer side of the lens mounting base, an inner chamber of the lens mounting base is a motor holding chamber, the stabilizer module comprises a first motor, a second motor, a third motor and a stabilizer frame body, the second motor and the third motor are provided in the motor holding chamber within the lens mounting base, the first motor is located below the lens mounting base, and the first motor, the second motor and the third motor are connected with the lens mounting base through the stabilizer frame body to realize motion transmission.

2. The 3D panoramic camera with a built-in stabilizer according to claim 1, wherein the stabilizer frame body comprises a bottom seat, a top seat located above the bottom seat, a vertically provided first supporting rod located between the bottom seat and the top seat, the second motor and the third motor are provided above the top seat, the first motor is provided below the bottom seat and connected with the bottom seat to drive the bottom seat to rotate, the supporting rod is fixedly connected with the bottom seat and the top seat through a connecting member, a second holding chamber is formed between the bottom seat and the top seat, image processing and storage modules connected with the optical information acquisition sensing module are provided in the second holding chamber, the first motor drives the entire 3D panoramic camera to rotate through the bottom seat, the second motor and the third motor drive the lens mounting base to rotate correspondingly, the first motor, the second motor and the third motor are provided perpendicular to each other, and 3D photographing by the camera is realized by driving the first to third motors.

3. The 3D panoramic camera with a built-in stabilizer according to claim 1, wherein a power supply module used for supplying power is provided on a bottom seat, and a cooling fan is provided above the power supply module;
a top surface of a base connecting portion is provided with an inertial sensor, and a top of the lens mounting base is provided with a hollowed-out protective cover in a covering manner; and a top surface of the lens mounting base is provided with an annular groove, and a counterweight stabilizing block is embedded in the annular groove.

4. The 3D panoramic camera with a built-in stabilizer according to claim 2, wherein the image processing and storage modules are circumferentially and uniformly provided, and the image processing and storage modules are connected with the lenses through image signal transmission lines; the image processing and storage modules are hung on a periphery of the second holding chamber through fixed pressing plates, and a power supply module and a cooling fan are provided at a central portion of the second holding chamber.

5. The 3D panoramic camera with a built-in stabilizer according to claim 2 wherein the stabilizer frame body further comprises a plurality of vertically provided second supporting rods connected with the top seat, a first connecting member provided between the second supporting rods and the second motor, a second connecting member provided between the second motor and the third motor, and a third connecting member provided between the third motor and the lens mounting base.

6. The 3D panoramic camera with a built-in stabilizer according to claim 3 wherein the stabilizer frame body further comprises a plurality of vertically provided second supporting rods connected with a top seat, a first connecting member provided between the second supporting rods and the second motor, a second connecting member provided between the second motor and the third motor, and a third connecting member provided between the third motor and the lens mounting base.

7. The 3D panoramic camera with a built-in stabilizer according to claim 4 wherein the stabilizer frame body further comprises a plurality of vertically provided second supporting rods connected with the top seat, a first connecting member provided between the second supporting rods and the second motor, a second connecting member provided between the second motor and the third motor, and a third connecting member provided between the third motor and the lens mounting base.

8. The 3D panoramic camera with a built-in stabilizer according to claim 5, wherein the first connecting member is mirrored L-shaped and comprises a second supporting rod connecting portion in parallel with the top seat, and a vertical second motor fixed connecting portion connected with a fixed portion of the second motor; the second connecting member comprises a second motor rotatable connecting portion connected with a rotatable portion of the second motor, and a third motor fixed connecting portion connected with a fixed portion of the third motor; and the second motor rotatable connecting portion of the second connecting member is perpendicular to the third motor fixed connecting portion such that the second motor and the third motor are provided perpendicular to each other.

9. The 3D panoramic camera with a built-in stabilizer according to claim 6, wherein the first connecting member is mirrored L-shaped and comprises a second supporting rod connecting portion in parallel with the top seat, and a vertical second motor fixed connecting portion connected with a fixed portion of the second motor; the second connecting member comprises a second motor rotatable connecting portion connected with a rotatable portion of the second motor, and a third motor fixed connecting portion connected with a fixed portion of the third motor; and the second motor rotatable connecting portion of the second connecting member is perpendicular to the third motor fixed connecting portion such that the second motor and the third motor are provided perpendicular to each other.

10. The 3D panoramic camera with a built-in stabilizer according to claim 7, wherein the first connecting member is mirrored L-shaped and comprises a second supporting rod connecting portion in parallel with the top seat, and a vertical second motor fixed connecting portion connected with a fixed portion of the second motor; the second connecting member comprises a second motor rotatable connecting portion connected with a rotatable portion of the second motor, and a third motor fixed connecting portion connected with a fixed portion of the third motor; and the second motor rotatable connecting portion of the second connecting member is perpendicular to the third motor fixed connecting portion such that the second motor and the third motor are provided perpendicular to each other.

11. The 3D panoramic camera with a built-in stabilizer according to claim 8, wherein the second motor rotatable connecting portion of the second connecting member is connected with the rotatable portion of the second motor by means of clamping, and the third motor fixed connecting portion of the second connecting member is detachably connected with the fixed portion of the third motor by means of a screw.

12. The 3D panoramic camera with a built-in stabilizer according to claim 9, wherein the second motor rotatable connecting portion of the second connecting member is connected with the rotatable portion of the second motor by means of clamping, and the third motor fixed connecting portion of the second connecting member is detachably connected with the fixed portion of the third motor by means of a screw.

13. The 3D panoramic camera with a built-in stabilizer according to claim 10, wherein the second motor rotatable connecting portion of the second connecting member is connected with the rotatable portion of the second motor by means of clamping, and the third motor fixed connecting portion of the second connecting member is detachably connected with the fixed portion of the third motor by means of a screw.

14. The 3D panoramic camera with a built-in stabilizer according to claim 5, wherein the third connecting member comprises a base connecting portion connected with the lens mounting base, the base connecting portion having two ends, a third motor rotatable connecting portion connected with a rotatable portion of the third motor and a plurality of vertically provided third supporting rods located between the second motor rotatable connecting portion and the third motor rotatable connecting portion, the third motor rotatable connecting portion is annular, a supporting plate is provided on an outer side of the third motor rotatable connecting portion, the base connecting portion is in parallel with the supporting plate, and the third supporting rods are provided between the base connecting portion and the supporting plate; and the two ends of the base connecting portion are connected with the lens mounting base such that the base connecting portion is connected across the lens mounting base.

15. The 3D panoramic camera with a built-in stabilizer according to claim 6, wherein the third connecting member comprises a base connecting portion connected with the lens mounting base, the base connecting portion having two ends, a third motor rotatable connecting portion connected with a rotatable portion of the third motor and a plurality of vertically provided third supporting rods located between the second motor rotatable connecting portion and the third motor rotatable connecting portion, the third motor rotatable connecting portion is annular, a supporting plate is provided on an outer side of the third motor rotatable connecting portion, the base connecting portion is in parallel with the supporting plate, and the third supporting rods are provided between the base connecting portion and the supporting plate; and the two ends of the base connecting portion are connected with the lens mounting base such that the base connecting portion is connected across the lens mounting base.

16. The 3D panoramic camera with a built-in stabilizer according to claim 7, wherein the third connecting member comprises a base connecting portion connected with the lens mounting base, the base connecting portion having two ends, a third motor rotatable connecting portion connected with a rotatable portion of the third motor and a plurality of vertically provided third supporting rods located between the second motor rotatable connecting portion and the third motor rotatable connecting portion, the third motor rotatable connecting portion is annular, a supporting plate is provided on an outer side of the third motor rotatable connecting portion, the base connecting portion is in parallel with the supporting plate, and the third supporting rods are provided between the base connecting portion and the supporting plate; and the two ends of the base connecting portion are connected with the lens mounting base such that the base connecting portion is connected across the lens mounting base.

17. The 3D panoramic camera with a built-in stabilizer according to claim 2, wherein a shell is provided below the bottom seat, a rotatable portion of the first motor is connected with the bottom seat through a plurality of vertical connecting rods, and the connecting rods are circumferentially and uniformly provided; and an electrical chamber is formed among the shell, the first motor and the bottom seat, a switching circuit, a charging circuit and a debugging module are provided in the electrical chamber, and the debugging module is provided with a USB interface and/or wireless communication module.

18. The 3D panoramic camera with a built-in stabilizer according to claim 2, wherein a cover body is provided between the bottom seat and the top seat, and the cover body is formed by front and rear cover body units spliced together; a panel for input and output and a communication interface are embedded in the cover body; and an electrical chamber is formed among the cover body, the bottom seat and the top seat, an integrated circuit board for image processing and storage connected with the lenses is hung in an upper chamber of the electrical chamber through a fourth supporting rod, a radiator is hung under the integrated circuit board through a fifth supporting rod, and a power supply module fixed on the bottom seat is provided below the radiator.

19. The 3D panoramic camera with a built-in stabilizer according to claim 3, wherein a cover body is provided between the bottom seat and a top seat, and the cover body is formed by front and rear cover body units spliced together; a panel for input and output and a communication interface are embedded in the cover body; and an electrical chamber is formed among the cover body, the bottom seat and the top seat, an integrated circuit board for image processing and storage connected with the lenses is hung in an upper chamber of the electrical chamber through a fourth supporting rod, a radiator is hung under the integrated circuit board through a fifth supporting rod, and the power supply module fixed on the bottom seat is provided below the radiator.

\* \* \* \* \*